United States Patent Office 3,274,901
Patented Sept. 27, 1966

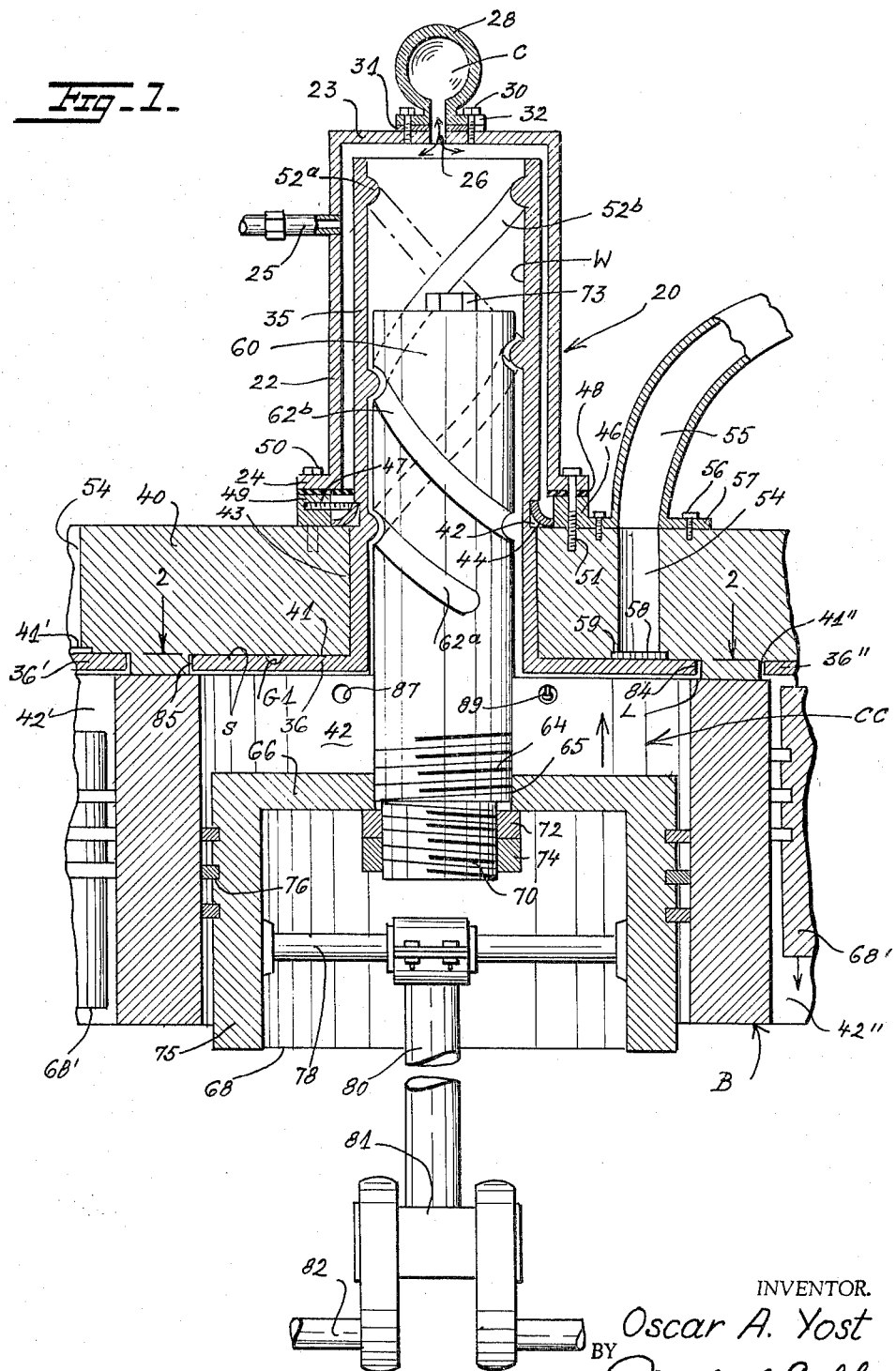

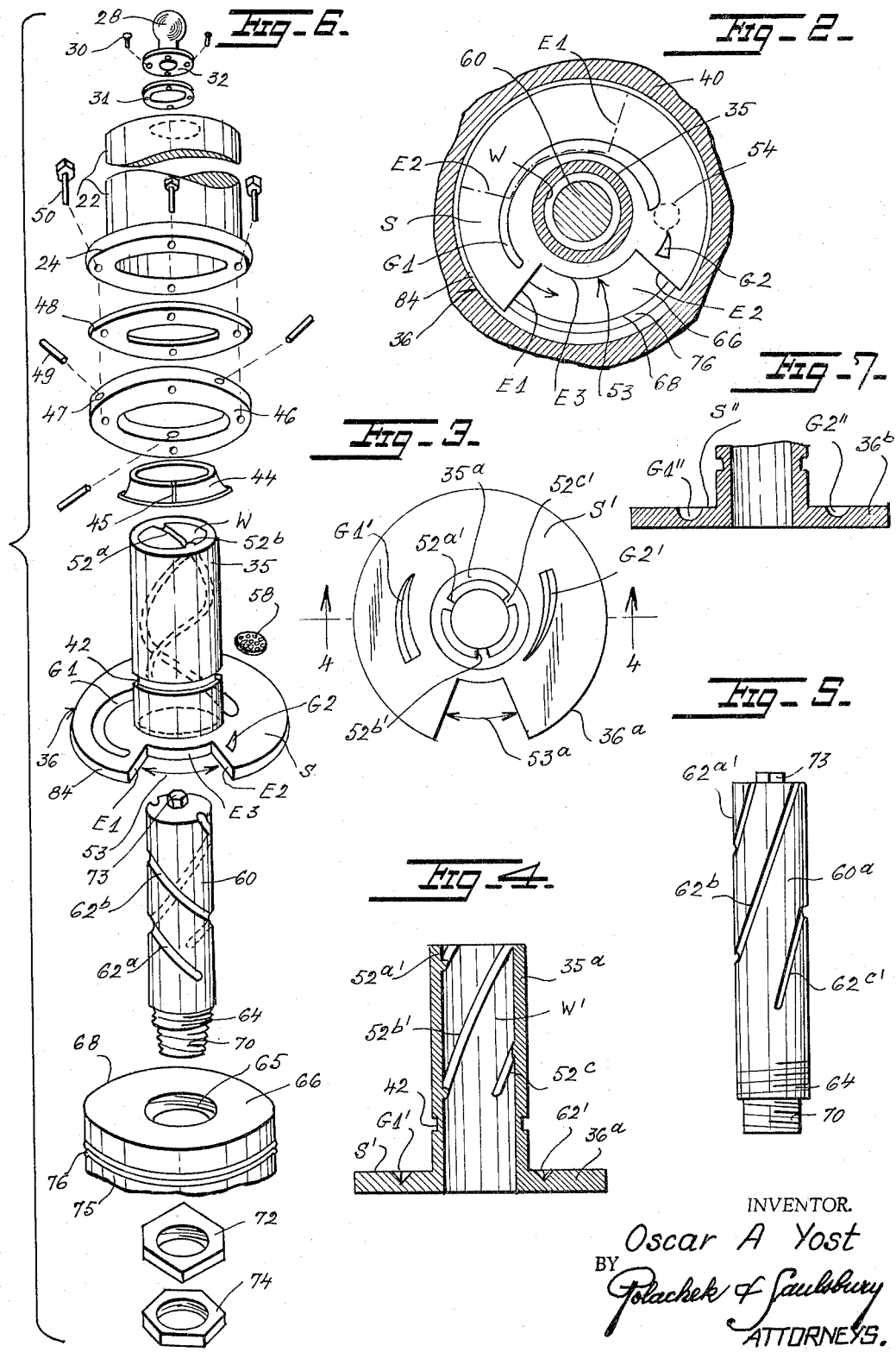

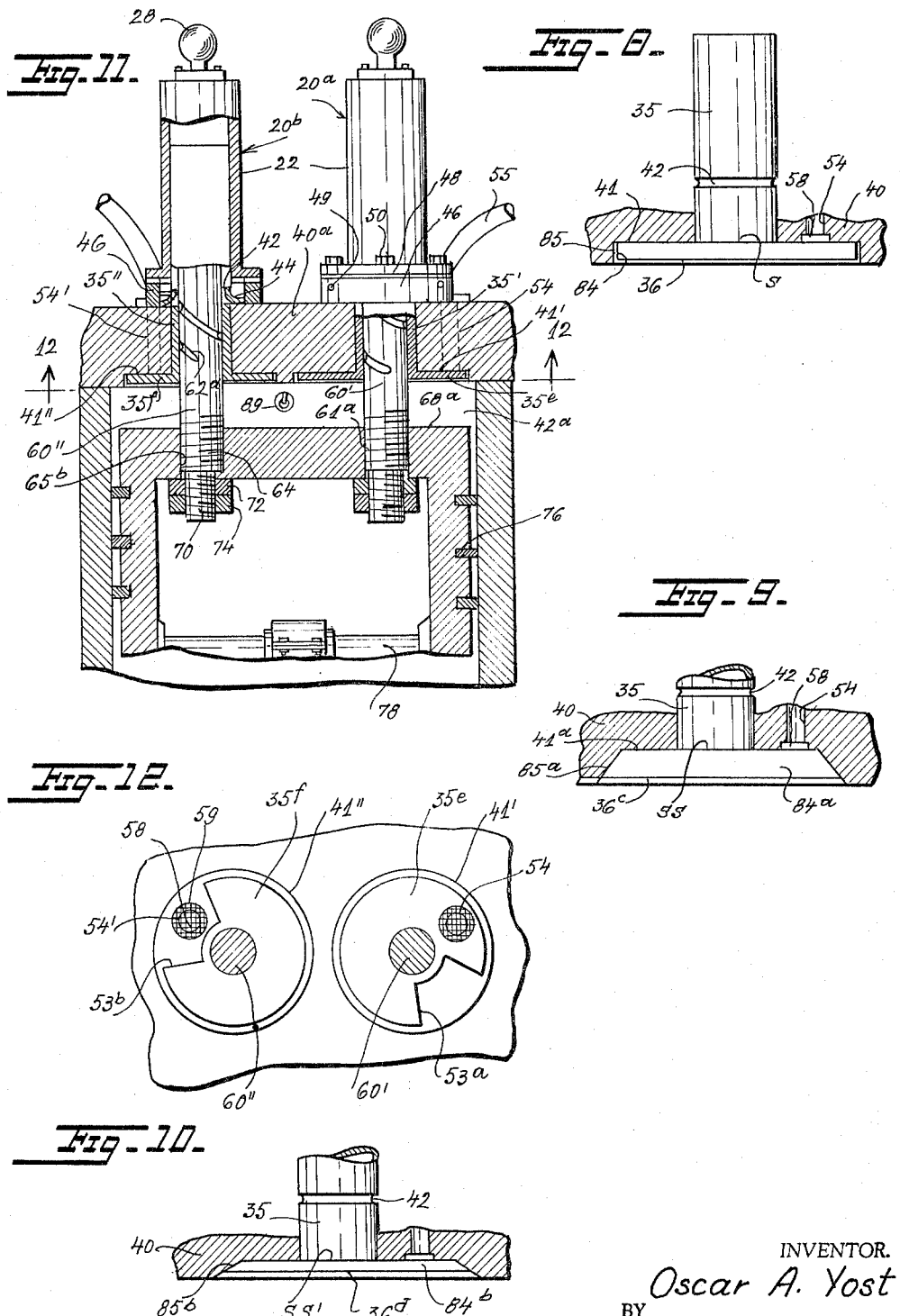

3,274,901
OSCILLATING PORT VALVE
Oscar A. Yost, 302 W. 22nd St., New York, N.Y.
Filed Sept. 28, 1964, Ser. No. 399,715
20 Claims. (Cl. 91—392)

This invention concerns an oscillating port valve.

The invention is especially adapted for use in internal combustion engines having reciprocating pistons, but it can be used as a port valve in any device having a reciprocating member and a port adjacent to the reciprocating member to open and close the port by oscillating thereat in coordination with reciprocating movement of said member.

According to the invention there is provided a valve having a central rod or core which can be secured to a piston head in a cylinder of an internal combustion engine. The rod or core has one or more helical grooves. Engaged in the helical grooves are helical threads on the interior surface of a cylindrical or tubular valve sleeve. The valve sleeve has at one end an annular valve plate in which is a notch extending radially inward of the periphery of the plate. The valve plate is disposed in a valve seat and juxtaposed to a port in the engine head. While the valve core reciprocates during operation of the engine, the valve plate oscillates rotationally in its seat to open and close the port. The valve core reciprocates axially in the valve sleeve to cause the valve sleeve and valve plate to oscillate rotationally. Two valves may be provided in an engine cylinder having two ports. Both valves will have cores secured to the piston head in the engine cylinder for simultaneous oscillation of the sleeves and plates of both valves. Each of the valves includes a casing which surrounds the oscillating sleeve. An air chamber may be provided in the valve casing to reduce back pressure on the valve core as it reciprocates axially in the valve sleeve. A spring loaded seating ring is provided in each valve surrounding the sleeve to hold it snugly against the engine head and prevent axial movement of sleeve and plate. The valve core may be locked to the piston head in the engine cylinder by a reverse threaded arrangement secured by one or more locknuts. Suitably shaped grooves may be provided in the upper working face of each valve plate for self-cleaning purposes.

It is therefore a principal object of the invention to provide a valve assembly for a port in an engine or other device having a reciprocating member, the valve having a rotatable element being operatively connected to the reciprocating member to open and close the port in coordination with reciprocations of said member.

Another object is to provide a valve assembly for a port in an engine or other device having a reciprocating member, the valve assembly including a core connected to the reciprocating member and movable axially in a rotatable sleeve having an annular plate covering the port, with helical threaded means engaging the core and sleeve so that the sleeve oscillates rotationally while the core reciprocates.

A further object is to provide a valve assembly as described, with novel reverse threaded means for locking the valve core to the reciprocating member which drives the core.

Still another object is to provide a valve assembly as described, with novel spring means for preventing axial movement of the valve sleeve while permitting free oscillatory rotational movement thereof.

A still further object is to provide a valve assembly as described enclosed in a cylindrical casing having an oil inlet and an air compression chamber to relieve gas pressure on the reciprocating valve core.

Another object is to provide a valve assembly as described with spiral grooves in the valve plate to render it self-cleaning.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure:

FIG. 1 is a longitudinal central sectional view of a valve assembly embodying the invention shown mounted in a cylinder of an internal combustion engine.

FIG. 2 is a fragmentary cross sectional view taken on line 2—2 of FIG. 1.

FIG. 3 is a top plan view of an oscillatory valve sleeve and valve plate.

FIG. 4 is a central, longitudinal sectional view taken on line 4—4 of FIG. 3.

FIG. 5 is a side elevational view of a valve core used with the valve sleeve of FIGS. 3, 4.

FIG. 6 is an exploded perspective view of parts of the valve assembly of FIG. 1, portions being broken away.

FIG. 7 is a fragmentary sectional view of a valve sleeve and plate similar to a portion of FIG. 4 showing a modified construction.

FIG. 8 is a side elevational view of a valve sleeve and valve plate in association with part of an engine head.

FIG. 9 and FIG. 10 are similar views to part of FIG. 8 and show modified forms of valve plates.

FIG. 11 is a fragmentary sectional view of an engine head, cylinder and piston, with two associated valve assemblies embodying the invention.

FIGURE 12 is a fragmenting cross sectional view taken on line 12—12 of FIGURE 11.

Referring first to FIGS. 1, 2 and 6, there is shown a valve assembly 20 including a cylindrical casing 22 having a closed top 23 and an open bottom. The casing has a peripheral annular flange 24 at its bottom end. An inlet pipe 25 for supplying lubricating oil to the valve assembly is connected to the casing and extends radially thereto. At the top of the casing is an opening 26. A spherical dome 28, having an air chamber C inside it, is secured over opening 26. The dome has an annular bottom flange 32 secured by bolts 30 to the top of the casing. A sealing gasket 31 is interposed between the top of the casing and flange 32.

Axially disposed inside the casing is a tubular valve sleeve 35 open at opposite ends. The sleeve carries an annular flange plate 36 at its bottom end. The plate 36 extends radially outward of the sleeve. The upper side S of plate 36 is abutted to the underside of engine head 40 in a circular recess 41 defining a valve seat at the top of cylinder 42 in engine block B. The sleeve 35 extends axially of bore 43 in the engine head and outwardly of the head 40 into the casing 22. The sleeve 35 has a circumferential groove 42 located at the upper side of the engine head. Engaged in this groove is a spring ring 44. This ring has a split 45 to permit the ring to be slipped axially over the sleeve and downwardly thereof for engaging in groove 42.

The ring 44 is tapered in form and its wider annular bottom end is abutted to a surrounding ring 46. Ring 46 is aligned with flange 24 with a sealing gasket 48 interposed between ring 46 and flange 24. Set screws 49 are inserted in holes 47 extending radially of the ring 46. These screws are set so as to prevent the upper narrower end of ring 44 from coming out of groove 42 during operation of the valve assembly.

Bolts 50 extend through holes in flange 24, gasket 48 and ring 46 and are anchored in threaded holes 51 in the top of the engine head 40. Ring 44 exerts an upward force on the sleeve 35 so as to keep the upper side S of plate 36 in abutment with the underside of the valve seat 41. The ring permits the sleeve 35 and plate 36 to oscillate rotationally while preventing the sleeve and plate from moving axially downward. The periphery of plate 36 overlays an annular ledge L at the top of cylinder 42 and is slightly spaced therefrom since the sleeve and plate are supported by ring 44. On the interior wall W of the sleeve 35 are two helical ridges or threads $52d$, $52b$ phased 180° apart and extending for the major length of the sleeve. The ridges extend about one and a quarter to one and a half turns around the wall W.

The plate 36 has a segmental cut-out 53 defined by two radially extending edges E1, E2 and an inner arcuate circumferentially extending edge E3 joining edges E1, E2. In the upper surface or side S of the plate 36 is a spiral groove G1 tapering in width and depth from end to end. This groove has a rounded bottom as clearly shown in FIG. 1.

The engine head 40 has an exhaust port 54 with which communicates an elbow discharge tube 55 having a flange 57 connected to the top of the head 40 by bolts 56. A circular screen or grid 58 is seated in a recess 59 at the underside of the engine head at the lower end of the port 54. This grid is located between the port and the upper side S of the valve plate 36. The port 54 is normally closed by an imperforate part of plate 36 as shown in FIGS. 1 and 2. When the valve plate oscillates, the port is periodically open to the cylinder 42 when the open portion 53 of the plate 36 underlays the port. In addition to groove G1, a second shorter tapered spiral groove G2 is located near edge E2 of opening 53.

Axially disposed inside the sleeve 35 and extending downwardly therefrom is a valve rod or valve core 60. This core has two helical grooves $62a$, $62b$ in which are respectively engaged the ridges or threads $52a$, $52b$ of sleeve 35. Near the bottom end of the core is a threaded portion 64 which is screwed into a threaded hole 65 in the top 66 of piston head 68. The bottom end of the core is formed with a further threaded portion 70 which is threaded in a reverse direction from that of portion 64. Threaded portion 70 has a smaller diameter than portion 64 in order to pass through hole 65. A locknut 72 is engaged on threaded portion 70 and a further locknut 74 may be engaged on the threaded end of the core underneath locknut 72. By this arrangement locknut 72 bears against the underside of the top 66 of the piston head and prevents the core from working loose from the piston head. The locknut 74 prevents locknut 72 from becoming loose. A hexagonal stud 73 at the top of core 60 is used in screwing the core into piston head 68. Head 68 has a cylindrical skirt 75 carrying sealing rings 76 inside of cylinder 42. The piston head carries a wrist pin 78 extending diametrically inside the head. Piston rod 80 is pivotally connected at one end to the wrist pin. The other end of the piston rod is connected by crank pin 81 pivotally to crankshaft 82 of the engine.

Other piston heads 68' and 68" are similarly disposed in adjacent cylinders 42', 42" respectively in block B. These cylinders are also provided with valve assemblies similar to valve assembly 20 described above. These other valve assemblies include valve plates 36' and 36" rotatably seated in valve seats 41' and 41" for operation in the same manner as valve plate 36.

It will be noted that the arrangement of the valve assemblies of FIG. 1 is such that the opening and closing of the valve ports cannot get out of coordination with the movements and positions of the piston heads 68, 68', and 68". This is because axial positions of the valve cores always determines the rotational positions of the valve sleeves and the location of the valve openings 53 with respect to the ports 54.

To install a valve assembly, the head 40 of the engine will be removed. Each valve core will be inserted into the top of a piston head and locked in place by the locknuts 72, 74. Each valve sleeve will then be placed down on its valve core and turned until the valve plate rests on the piston head. Then the engine head is placed on the engine block B with the valve sleeves extending out of the bores 43. The valve sleeves will then be turned on the valve cores until the upper surfaces S of the valve plates seat in the valve seats 41, 41' and 41", etc. As each valve sleeve is turned up a spring ring 44 can be pressed down on the sleeve and engaged in groove 42. Thereafter the rings 46 will be set in place and set screws 49 properly set against rings 44. Then gaskets 48 and casings 22 can be put in place and bolts 50 can be inserted and tightened. The engine head will then be tightened on the engine block. Grids 58 are friction fitted into seats 59 so that they do not fall out of the engine head when it is placed over the engine cylinders.

The domes 28 can be placed on the casings before or after the casings are set in place. The air chambers C in the domes will increase the internal volume of the casings so that when the cores 60 move axially up and down they are subjected to less back pressure than if the domes were not provided.

The combustion chamber CC of each cylinder 42, 42', 42", etc. has a conventional valve controlled inlet port 87 for feeding fuel into the chamber. A suitable ignition means 89 for the fuel is also provided. When the piston head 68, 68' or 68" is driven down during the expansion portion of the engine cycle the exhaust port will be closed by an imperforate part of flange plate 36, 36' or 36". Then when the piston head is moved up as the crank shaft 82 rotates, the core will move axially and rotate the valve sleeve 35 a fraction of a turn. Valve plate 36, 36' or 36" will turn with sleeve 35 to bring the opening 53 under port 54, whereupon the exhaust gas will be discharged through port 54. The pitch of the helical threads $52a$, $52b$ and $62a$, $62b$ can be such that the opening 53 can pass port 54 to the dotted line position shown in FIG. 2. Alternatively the opening 53 is turned clockwise as shown in FIG. 2 to open port 54 during the discharge portion of the engine cycle and then the valve plate will rotate in the opposite or counterclockwise direction back to the solid line position shown in FIG. 2.

The spiral grooves G1 and G2 serve as channels to pass carbon and soot scraped off the valve seat 41, 41' or 41" by edges E1, E2, E3, out of the exhaust port, so that the valve assembly is self-cleaning.

Two short spirally curved grooves G1' and G2' may be provided instead of the long spiral groove G1 and short spiral groove G2 as shown in the working surface S' of valve plate $36a$ in FIG. 3. The grooves can be V-shaped in cross section as clearly shown in FIGS. 3 and 4, or they can be rounded as shown by grooves G1" and G2" in surface S" of valve plate $36b$ in FIG. 7. The rounded form is preferred since carbon and soot are less likely to collect in the grooves with rounded bottoms.

It is possible to provide three helical threads or ridges $52a'$, $52b'$ and $52c'$ as shown in wall W' of valve sleeve $35a$ of FIGS. 3 and 4. These three ridges will engage in three helical grooves $62a'$, $62b'$ and $62c'$ formed in the outer surface of valve core $60a$ shown in FIG. 5. Other parts of the core are the same as in core 60 and are identically numbered.

The valve plate $36a$ is shown provided with an opening $53a$ which extends circumferentially less than the longer opening 53 of plate 36 shown in FIG. 2. This will provide for a shorter opening time of port 54 during the engine cycle.

Valve plate 36 as shown in FIGS. 1, 2, 6 and 8 has a cylindrical peripheral edge 84 disposed axially at right angles to the plane of working surface S of the valve plate. The valve seat 41 has a cylindrical wall 85 disposed concentrically with respect to the peripheral wall 84. It is possible to provide valve plate $36c$ with a beveled edge $84a$ as shown in FIG. 9. This edge will be disposed about 45° to the working surface SS of the valve plate.

The valve seat 41a will have a conical or tapered edge 85a to receive and seal with edge 84a. It is possible to employ a thinner valve plate as shown by the valve plate 36d in FIG. 10. This valve plate has its beveled peripheral edge 84b disposed about 30° to the plane of working surface SS'. The valve seat 41b has a conical edge 85b to receive and conform with beveled edge 84b. Other parts of FIGS. 9 and 10 corresponding to those of FIG. 8 are identically numbered.

FIG. 11 and FIG. 12 show two valve assemblies 20a and 20b provided for exhaust port 54 and inlet port 54' of an engine cylinder 42a. Two threaded holes 65a and 65b are provided in piston head 68a to engage the two valve cores 60' and 60". Each valve core is engaged with its own rotatable valve sleeve 35' and 35" and each has its own valve plate 35e, 35f in valve seats 41', 41" for opening the respective ports. The openings 53a, 53b in the valve plates are differently positioned so that when one valve plate opens one port the other valve plate closes the other port and vice versa as shown in FIG. 12.

Proper positioning of the valve sleeves and valve plates for proper phasing is very easily done for both the two valve assemblies of FIG. 11, in a manner similar to that described for the valve assemblies of FIG. 1. When the head 40a of the engine is removed, the cores of the valves are exposed and the valve sleeves can then be placed on the cores and turned down to the piston head 68a. Then after the head 40a is put in place, the valve sleeves can be turned up until the valve plates seat in their seats 41', 41". Thereafter the rings 44 are engaged in grooves 42 of the sleeves and rings 46 are applied. The set screws 49 are inserted and adjusted up to the rings 44. Then the gaskets 48 are put on. Casings 22 are placed over the sleeves and gaskets and bolts 50 are inserted to complete the assembly.

The valve assemblies described each have two or three parallel helical ridges or threads on the interior of the valve sleeve and two or three parallel grooves or threads on the adjacent exterior surface of the coaxial valve core receiving the helical ridges in sliding relationship so that the sleeves rotate in an oscillatory manner while the valve cores reciprocate axially. It will be understood that it is possible to provide just one helical ridge in the valve sleeve and just one helical groove in the valve core. It is also possible to provide more than three parallel ridges in the valve sleeve engaged with more than three parallel grooves in the valve core. Provision of more than one ridge and groove is preferred in most cases because of more uniform circumferential leverage exerted on the valve sleeve in turning as the valve core reciprocates.

It is also possible to reverse the positions of the ridges and grooves so that the ridges are provided on the external surface of the valve core and the grooves are formed in the interior surface of the valve sleeve.

Instead of two locknuts 72 and 74 on the threaded end of the valve core, it is possible to use a lockwasher and just one locknut. Other mechanical arrangements are possible to effect the same purpose, namely non-rotational but detachable engagement of the lower end of the valve core and piston head.

While I have illustrated and described the preferred embodiments of my invention, it is to be understood that I do not limit myself to the precise constructions herein disclosed and that various changes and modifications may be made within the scope of the invention as defined in the appended claims.

What is claimed is:

1. A valve assembly for cyclically opening and closing a port in the wall of a structure, comprising a cylindrical sleeve, an annular flange plate extending radially outward of one end of said sleeve and juxtaposable against said wall to cover said port, means for supporting said sleeve for oscillatory rotation on its axis while said plate remains juxtaposed to said wall, and an axially reciprocatable cylindrical valve core extending axially into said sleeve, said core and sleeve having mutually engaging helical threaded means so that the sleeve and plate oscillate rotationally while the valve core reciprocates, said flange plate having an opening at its periphery disposed to uncover and cover said port cyclically as the flange plate oscillates rotationally while the valve core reciprocates axially.

2. A valve assembly for cyclically opening and closing a port in a wall of a structure having a bore therethrough; comprising a cylindrical sleeve rotatably mountable in said one end of said sleeve and juxtaposable against said wall to cover said port, spring means for supporting said sleeve for oscillatory rotation on its axis and keeping said plate juxtaposed to said wall, an axially reciprocatable cylindrical valve core extending axially into said sleeve, mutually engaged helical threaded means on adjacent surfaces of the sleeve and core, and means for holding the valve core to prevent the same from rotating on its axis while axially reciprocating the valve core, said flange plate having an opening radially spaced from its near center, whereby said port is cyclically uncovered and covered by the opening in the flange plate while the valve core reciprocates axially and the sleeve and flange plate oscillate rotationally.

3. A valve assembly for an engine having a block, a cylinder in said block, a piston head axially reciprocatable in said cylinder, an engine head on said block covering said cylinder, a bore in said engine head opening into the cylinder, and a port in said engine head adjacent said bore and opening into the cylinder; comprising a cylindrical casing mounted on said engine head and extending axially outward of said bore, a cylindrical valve sleeve extending axially of said bore into said casing, an annular flange plate extending radially outward of one end of said sleeve, said engine head having a recess on one side facing the cylinder and defining a circular valve seat, said flange plate being seated in said recess to cover said port, a spring ring surrounding and engaging said sleeve on said engine head and biasing the sleeve axially outward so that one side of said flange plate is held against the engine head in said recess, an axially reciprocatable cylindrical core extending axially into said sleeve, mutually engaged helical threaded means on adjacent surfaces of the sleeve and core, means locking one end of the core to said piston head so that the core is prevented from rotating in said piston head, said flange plate having an opening radially spaced from its center completely uncovering said port in a predetermined range of circumferential rotation of said flange plate, whereby said port is cyclically uncovered and covered by the opening in the flange plate while the valve core is reciprocated by the piston head, and the sleeve and flange plate oscillate rotationally while the threaded means of the valve core slides along the threaded means of the valve sleeve.

4. A valve assembly for an engine having a block, a cylinder in said block, a piston head axially reciprocatable in said cylinder, an engine head on said block covering said cylinder, a bore in said engine head opening into the cylinder, and a port in said engine head adjacent said bore and opening into the cylinder; comprising a cylindrical casing mounted on said engine head and extending axially outward of said bore, a cylindrical valve sleeve extending axially of said bore into said casing, an annular flange plate extending radially outward of one end of said sleeve, said engine head having a recess on one side facing the cylinder and defining a circular valve seat, said flange plate being seated in said recess to cover said port, a spring ring surrounding and engaging said sleeve on said engine head and biasing the sleeve axially outward so that one side of said flange plate is held against the engine head in said recess, axially reciprocatable cylindrical core extending axially into said sleeve, mutually engaged helical threaded means on adjacent surfaces of the sleeve and core, means locking one end of the core to said piston head so that the core is prevented from rotating in said piston head, said flnage plate having an opening radially spaced from its center completely uncovering said port in a predetermined range of circumferential rotation of said flange plate, whereby said port is cyclically uncovered and covered by the opening in the flange plate while the valve core is reciprocated by the piston head, and the sleeve and flange plate oscillate rotationally while the threaded means of the valve core slides along the threaded means of the valve sleeve, and a hollow dome on the outer end of said casing having an air chamber open to the valve core for compression and expansion of air in said air chamber while the valve core reciprocates in the valve sleeve.

5. A valve assembly for an engine having a block, a cylinder in said block, a piston head axially reciprocatable in said cylinder, an engine head on said block covering said cylinder, a bore in said engine head opening into the cylinder, and a port in said engine head adjacent said bore and opening into the cylinder; comprising a cylindrical casing mounted on said engine head and extending axially outward of said bore, a cylindrical valve sleeve extending axially of said bore into said casing, an annular flange plate extending radially outward of one end of said sleeve, said engine head having a recess on one side facing the cylinder and defining a circular valve seat, said flange plate being seated in said recess to cover said port, a spring ring surrounding and engaging said sleeve on said engine head and biasing the sleeve axially outward so that one side of said flange plate is held against the engine head in said recess, axially reciprocatable cylindrical core extending axially into said sleeve, mutually engaged helical threaded means on adjacent surfaces of the sleeve and core, means locking one end of the core to said piston head so that the core is prevented from rotating in said piston head, said flange plate having an opening radially spaced from its center completely uncovering said port in a predetermined range of circumferential rotation of said flange plate, whereby said port is cyclically uncovered and covered by the opening in the flange plate while the valve core is reciprocated by the piston head, and the sleeve and flange plate oscillate rotationally while the threaded means of the valve core slides along the threaded means of the valve sleeve, said one side of the flange plate having at least one spiral groove for passing to said port particles of carbon scraped off of said seat by edges of the opening in said flange plate.

6. A valve assembly for an engine having a block, a cylinder in said block, a piston head axially reciproctatable in said cylinder, an engine head on said block covering said cylinder, a bore in said engine head opening into the cylinder, and a port in said engine head adjacent said bore and opening into the cylinder; comprising a cylindrical casing mounted on said engine head and extending axially outward of said bore, a cylindrical valve sleeve extending axially of said bore into said casing, an annular flange plate extending radialy outward of one end of said sleeve, said engine head having a recess on one side facing the cylinder and defining a circular valve seat, said flange plate being seated in said recess to cover said port, a spring ring surrounding and engaging said sleeve on said engine head and biasing the sleeve axially outward so that one side of said flange plate is held against the engine head in said recess, an axially reciprocatable cylindrical core extending axially into said sleeve, mutually engaged helical threaded means on adjacent surfaces of the sleeve and core, means locking one end of the core to said piston head so that the core is prevented from rotating in said piston head, said flange plate having an opening radially spaced from its center completely uncovering said port in a predetermined range of circumferential rotation of said flange plate, whereby said port is cyclically uncovered and covered by the opening in the flange plate while the valve core is reciprocated by the piston head, and the sleeve and flange plate oscillate rotationally while the threaded means of the valve core slides along the threaded means of the valve sleeve, and a hollow dome on the outer end of said casing having an air chamber open to the valve core for compression and expansion of air in said air chamber while the valve core reciprocates in the valve sleeve, said one side of the flange plate having two spirally curved grooves for passing to said port particles of carbon scraped off of said seat by edges of the opening in the flange plate.

7. A valve assembly comprising a rotationally oscillatable cylindrical valve sleeve, at least one helical ridge in said sleeve for engaging in a helical groove of a valve core, an annular flange plate extending radialy outward of said sleeve at one end thereof for seating in a valve seat, a segmental opening in said flange plate for covering and uncovering a port, and spiral grooves in said plate near opposite ends of said opening for passing to said port particles scraped off of said seat by edges of said opening.

8. A valve assembly comprising a rotationally oscillatable cylindrical valve sleeve, at least one helical ridge in said sleeve for engaging in a helical groove of a valve core, an annular flange plate extending radially outward of said sleeve at one end thereof for seating in a valve seat, a segmental opening in said flange plate for covering and uncovering a port, and spiral grooves in said plate near opposite ends of said opening for passing to said port particles scraped off of said seat by edges of said opening, said flange plate having a cylindrical edge for fitting concentrically within a corresponding edge of said valve seat.

9. A valve assembly comprising a rotationally oscillatable cylindrical valve sleeve, at least one helical ridge in said sleeve for engaging in a helical groove of a valve core, an annular flange plate extending radially outward of said sleeve at one end thereof for seating in a valve seat, a segmental opening in said flange plate for covering and uncovering a port, and spiral grooves in said plate near opposite ends of said opening for passing to said port particles scraped off of said seat by edges of said opening, said flange plate having a beveled edge for fitting against a corresponding beveled peripheral edge of said valve seat.

10. A valve assembly comprising a rotationally oscillatable cylindrical valve sleeve, at least one helical ridge in said sleeve for engaging in a helical groove of a valve core, an annular flange plate extending radially outward of said sleeve at one end thereof for seating in a valve seat, a segmental opening in said flange plate for covering and uncovering a port, and spiral grooves in said plate near opposite ends of said opening for passing to said port particles scraped off of said seat by edges of said opening, said spiral grooves being unequal in length.

11. A valve assembly comprising a rotationally oscillatable cylindrical valve sleeve, at least one helical ridge in said sleeve for engaging in a helical groove of a valve core, an annular flange plate extending radially outward of said sleeve at one end thereof for seating in a valve seat, a segmental opening in said flange plate for covering and uncovering a port, and spiral grooves in said plate near opposite ends of said opening for passing to said port particles scraped off of said seat by edges of said opening, said spiral grooves being V-shaped in cross section.

12. A valve assembly comprising a rotationally oscillatable cylindrical valve sleeve, at least one helical ridge in said sleeve for engaging in a helical groove of a valve core, an annular flange plate extending radially outward of said sleeve at one end thereof for seating in a valve seat, a segmental opening in said flange plate for covering and uncovering a port, and spiral grooves in said plate near opposite ends of said opening for passing to said port particles scraped off of said seat by edges of said opening, said spiral grooves being rounded in cross section.

13. A valve assembly comprising a rotationally oscillatable cylindrical valve sleeve, helical ridge in said sleeve, an axially reciprocatable cylindrical core in said sleeve, said core having a helical groove slidably receiving said ridge, an annular flange plate extending radially outward of said sleeve at one end thereof for seating in a valve seat, a segmental opening in said flange plate for covering and uncovering a port, and spiral grooves in said plate near opposite ends of said opening for passing to said port particles scraped off of said seat by edges of said opening.

14. A valve assembly comprising a rotationally oscillatable valve sleeve, a plurality of helical ridges in said sleeve, an axially reciprocatable cylindrical core in said sleeve, said core having a plurality of helical grooves slidably receiving the ridges respectively for oscillating the sleeve rotationally while the core reciprocates axially without rotating, an annular flange plate extending radially outward of said sleeve at one end thereof for seating in a valve seat, a segmental opening in said flange plate for covering and uncovering a port, and spiral grooves in said plate near opposite ends of said opening for passing to said port particles scraped off of said seat by edges of said opening.

15. A valve assembly comprising a rotationally oscillatable cylindrical valve sleeve, helical ridge in said sleeve, an axially reciprocatable cylindrical core in said sleeve, said core having a helical groove slidably receiving said ridge, an annular flange plate extending radially outward of said sleeve at one end thereof for seating in a valve seat, a segmental opening in said flange plate for covering and uncovering a port, and spiral grooves in said plate near opposite ends of said opening for passing to said port particles scraped off of said seat by edges of said opening, said core having a first threaded portion near one end for engaging in a threaded bore in a piston head, said core having a second threaded portion threaded reversely from the threading of the first threaded portion for receiving a locknut to keep the core locked non-rotationally in the piston head.

16. A valve assembly comprising a rotationally oscillatable valve sleeve, a plurality of helical ridges in said sleeve, an axially reciprocatable cylindrical core in said sleeve, said core having a plurality of helical grooves slidably receiving the ridges respectively for oscillating the sleeve rotationally while the core reciprocates axially without rotating, an annular flange plate extending radially outward of said sleeve at one end thereof for seating in a valve seat, a segmental opening in said flange plate for covering and uncovering a port, and spiral grooves in said plate near opposite ends of said opening for passing to said port particles scraped off of said seat by edges of said opening, said core having a first threaded portion near one end for engaging in a threaded bore in a piston head, said core having a second threaded portion threaded reversely from the threading of the first threaded portion for receiving a locknut to keep the core locked non-rotationally in the piston head.

17. A valve assembly for an engine having a block, a cylinder in said block, a piston head axially reciprocatable in said cylinder, an engine head on said block covering said cylinder, a bore in said engine head opening into the cylinder, and a port in said engine head adjacent said bore and opening into the cylinder; comprising a cylindrical casing mounted on said engine head and extending axially outward of said bore, a cylindrical valve sleeve extending axially of said bore into said casing, an annular flange plate extending radially outward of one end of said sleeve, said engine head having a recess on one side facing the cylinder and defining a circular valve seat, said flange plate being seated in said recess to cover said port, a spring ring surrounding and engaging said sleeve on said engine head and biasing the sleeve axially outward so that one side of said flange plate is held against the engine head in said recess, an axially reciprocatable cylindrical core extending axially into said sleeve, mutually engaged helical threaded means on adjacent surfaces of the sleeve and core, means locking one end of the core to said piston head so that the core is prevented from rotating in said piston head, said flange plate having an opening radially spaced from its center completely uncovering said port in a predetermined range of circumferential rotation of said flange plate, whereby said port is cyclically uncovered and covered by the opening in the flange plate while the valve core is reciprocated by the piston head, and the sleeve and flange plate oscillate rotationally while the threaded means of the valve core slides along the threaded means of the valve sleeve.

18. A valve assembly for an engine having a block, a cylinder in said block, a piston head axially reciprocatable in said cylinder, an engine head on said block covering said cylinder, a bore in said engine head opening into the cylinder, and a port in said engine head adjacent said bore and opening into the cylinder; comprising a cylindrical casing mounted on said engine head and extending axially outward of said bore, a cylindrical valve sleeve extending axially of said bore into said casing, an annular flange plate extending radially outward of one end of said sleeve, said engine head having a recess on one side facing the cylinder and defining a circular valve seat, said flange plate being seated in said recess to cover said port, a spring ring surrounding and engaging said sleeve on said engine head and biasing the sleeve axially outward so that one side of said flange plate is held against the engine head in said recess, an axially reciprocatable cylindrical core extending axially into said sleeve, a plurality of first parallel helical threads on the interior surface of said sleeve, another plurality of parallel helical threads on the external surface of said core slidably engaged with the first helical threads, a first threaded portion near one end of the core, a second threaded portion at said one end of the core reversely threaded from the first threaded portion so that the first threaded portion can be engaged in a threaded hole in said piston head an a locknut can be engaged on the second threaded portion to lock the core against rotation on said piston head, the second threaded portion being smaller in diameter than the first threaded portion to pass through the hole in the piston head, said flange plate having an opening radially spaced from its center completely uncovering said port in a predetermined range of circumferential rotation of said flange plate, whereby said port is cyclically uncovered and covered by the opening in the flange plate while the valve core is reciprocated by the piston head, and the sleeve and flange plate oscillate rotationally while the threaded means of the valve core slides along the threaded means of the valve sleeve.

19. A valve assembly for an engine having a block, a cylinder in said block, a piston head axially reciprocatable in said cylinder, an engine head on said block covering said cylinder, a pair of bores in said engine head opening into the cylinder, two ports in said engine head adjacent the bores respectively opening into the cylinder; comprising two cylindrical casings mounted on said engine head and extending axially outward of said bores respectively, two cylindrical valve sleeves extending axially of said bores respectively into the respective casings, an annular flange plate extending radially outward of one end of each sleeve, said engine head having two recesses on one side facing the cylinder and defining circular valve seats, the flange plates being seated in the recesses respectively to cover the respective ports, spring rings surrounding and engaging the respective sleeves on the engine head and biasing the sleeves axially outward so that one side of each flange plate is held against the engine head in said recesses, axially reciprocatable valve cores extending axially into said sleeves respectively, mutually engaged helical threaded means on adjacent surfaces of the sleeves and cores so that the sleeves rotate in an oscillatory manner when the cores reciprocate axially, means locking one end of each core non-rotationally to the piston head, each flange plate having an opening spaced radially from its center for completely uncovering an adjacent port in a predetermined range of circumferential range of rotation of the flange plate, whereby the ports are cyclically uncovered and covered by the openings in the flange plates while the valve cores are simultaneously reciprocated by the piston head and the sleeves and flange plates oscillate rotationally.

20. A valve assembly according to claim 19, wherein said mutually engaged helical threaded means includes a plurality of parallel helical ridges on the interior surface of each sleeve and a plurality of parallel helical grooves in the exterior surface of each core receiving the adjacent helical ridges in sliding relationship.

No references cited.

MARK NEWMAN, *Primary Examiner.*

W. E. BURNS, *Assistant Examiner.*